(12) United States Patent
Klein

(10) Patent No.: US 6,892,672 B2
(45) Date of Patent: May 17, 2005

(54) APPARATUS FOR BREEDING FISH IN OPEN SEA

(75) Inventor: Shlomo Klein, Tel-Aviv (IL)

(73) Assignee: F.F.T. Ltd., Beer-Sheva (IL)

( * ) Notice: Subject to any disclaimer, the term of this patent is extended or adjusted under 35 U.S.C. 154(b) by 0 days.

(21) Appl. No.: 10/329,882

(22) Filed: Dec. 26, 2002

(65) Prior Publication Data

US 2004/0123809 A1 Jul. 1, 2004

Related U.S. Application Data

(63) Continuation of application No. PCT/IL01/00608, filed on Jul. 2, 2004.

(30) Foreign Application Priority Data

Mar. 7, 2000 (IL) ................................................. 137151

(51) Int. Cl.[7] .............................................. A01K 61/00
(52) U.S. Cl. ....................... 119/223; 119/208; 119/239; 119/240; 119/238; 119/241; 119/221; 441/135; 114/123; 43/103; 43/102
(58) Field of Search ................................. 119/223, 208, 119/221, 239, 240, 235, 241; 43/103, 102

(56) References Cited

U.S. PATENT DOCUMENTS

| | | | | |
|---|---|---|---|---|
| 808,102 A | * | 12/1905 | Mattle | |
| 2,989,945 A | * | 6/1961 | Ford | |
| 4,244,323 A | * | 1/1981 | Morimura | 119/223 |
| 4,257,350 A | | 3/1981 | Streichenberger | |
| 4,344,384 A | * | 8/1982 | Rowley | 119/4 |
| 5,412,903 A | | 5/1995 | Zemach et al. | |
| 5,628,280 A | * | 5/1997 | Ericsson | 119/239 |
| 5,845,602 A | * | 12/1998 | Kaarstad et al. | 119/223 |
| 5,970,917 A | * | 10/1999 | Keith | 119/223 |
| 6,481,378 B1 | * | 11/2002 | Zemach | 119/223 |

FOREIGN PATENT DOCUMENTS

| | | | |
|---|---|---|---|
| FR | 2467140 | 4/1981 | |
| FR | 2507436 | 12/1982 | |
| FR | 2665332 | * 8/1990 | .......... A01K/61/00 |
| FR | 2665332 | 2/1992 | |
| NO | B 153991 | 12/1984 | |
| NO | B 177551 | 7/1995 | |
| WO | WO 89/06902 | * 8/1989 | .......... A01K/61/00 |
| WO | WO 90/09100 | 8/1990 | |

OTHER PUBLICATIONS

Internatinal Search Report for PCT/IL01/00608 (3 pages).
International Preliminary Examination Report for PCT/IL01/00608 (4 pages).
Norwegian Patent Office description of Norwegian Patent Nos. NO B 153991 and NO b 177551, translated Sep. 8, 2003, 2 pages.

* cited by examiner

Primary Examiner—Peter M. Poon
Assistant Examiner—Andrea M. Valenti
(74) Attorney, Agent, or Firm—Roach Brown McCarthy & Gruber, P.C.; Kevin D. McCarthy (57) ABSTRACT

Fish-breeding apparatus (10), which comprises a frame, supporting one or a plurality of breeding cages (11) and provided with hollow buoyancy elements (17), and at least one device for controlling the buoyancy of the apparatus by filling, totally or partially, the buoyancy elements with water and emptying them of the water, totally or partially, whenever desired. The buoyancy elements are emptied of water by replacing the water with air. The buoyancy elements are such that when they are empty of water to a predetermined extent, the entire apparatus floats, even when it is fully charged. The frame has depending legs (17), so that even in its lowermost position the bottoms of the breeding cage will be spaced from the sea bed.

22 Claims, 7 Drawing Sheets

APPARATUS FOR BREEDING FISH IN OPEN SEA

This application is a continuation of PCT/IL01/00608 filed Jul. 2, 2004

FIELD OF THE INVENTION

This invention relates to an apparatus for breeding fish in the open sea, comprising breeding containers and means for causing them to float or lowering it below the water surface, as required.

BACKGROUND OF THE INVENTION

It has been attempted for some time to provide containers or cages for breeding fish in natural bodies of water. These containers have walls which allow water to pass, such as walls of netting, for the purpose of renewing the water content and sweeping out the excrements produced by the metabolism of the fish. They must be kept normally at the water surface, so that the fish may be fed and their breeding may be controlled. Fish can be introduced into such containers, they can be fed, and their growth can be controlled, so that they can be harvested at the proper time. While this method of breeding is not adapted to all kinds of fish, it is highly effective for those kinds to which it is adapted, and permits providing fish food more conveniently and economically than afforded by normal fishing techniques.

However, such breeding containers must be protected against excessively violent wave motion, such as caused by storms, which would cause heavy damage or destruction of the container. For this purpose, it has been proposed to place the fish-breeding containers near the shore in partially enclosed bodies of water, such as in bays or fjords, in which the wave motion is moderate even during storms on the open sea. However, locating the containers near the shore creates severe pollution, due to the metabolism of the fish and to the feed provided to them, so that this method has been practically abandoned.

Pollution can be avoided by locating the containers in the open sea, whereby the waves and currents sweep out the pollution and disperse it, the operation of the containers being controlled from a near-by vessel. However, in this case, they must be safeguarded against severe wave motion and therefore, if a storm approaches, they must be lowered below the water surface while the control vessel finds refuge in a harbor. All these proposals, however, rely on pulleys or, in general, rotatable guides located at the bottom of the sea. In time, marine fouling, such as barnacles, grows on said devices and renders them inoperative. Therefore, this method of breeding fish in containers in the open sea has not been successful, so far.

It is a purpose of this invention to provide an apparatus and a method for breeding fish in containers in the open sea.

It is another purpose to provide such an apparatus and method which are proof against the marine fouling of any elements thereof.

It is a further purpose to provide such a method and apparatus that afford complete and easy control of the breeding of the fish.

It is a still further purpose to provide such a method and apparatus that permit lowering the breeding containers below the water surface, when needed, under full control and at the desired speed.

It is a still further purpose to provide such a method and apparatus that permit raising the fish-breeding container, when the need to keep it underwater has passed, with the desired speed and under control, and to keep it floating under normal conditions.

Other purposes and advantages of the invention will appear, as the description proceeds.

SUMMARY OF THE INVENTION

It should be understood that a fish-breeding apparatus requires constant supervision and therefore, the presence of a control vessel, which is provided with power means, pumping means and whatever accessories are required. The control vessel can of course abandon the open sea location and find refuge in a harbor whenever a storm is foreseen, to return to its operating position when the storm has ceased.

This being understood, the apparatus of the invention comprises a frame, supporting one or, preferably, a plurality of breeding containers—hereinafter also called "cages"— and comprises one or, preferably, a plurality of hollow buoyancy elements, which may be part of the frame or have other structural functions or may be additional elements supported by the frame, such as tubing, and further comprises means for controlling the buoyancy of said buoyancy elements by filling them, totally or partially, with water and emptying them of the water, totally or partially, when desired, preferably by replacing the water with air. The apparatus can be called, and sometimes will be called hereinafter, "breeding assembly". The volume of the buoyancy elements must be such that when they are empty of water to a predetermined extent, the entire apparatus may float, even when it is fully charged, as will be explained hereinafter. It is desirable that the apparatus will float when the buoyancy elements are almost, but not quite completely emptied of water, for structural convenience and for allowing some residual possibility of maneuver.

Preferably, the frame is provided with depending legs that contact the sea bed in the lowermost position of the breeding assembly, and preferably said legs are at least partly hollow and constitute the buoyancy elements.

The frame supports a number of breeding containers, each of which is constituted by material that allows the passage of water, such as screen material. The bottoms of the breeding container are spaced from the sea bed even in the lowermost position of the breeding assembly, because of the presence of the aforesaid depending legs.

The apparatus or breeding assembly of the invention is provided with means for lowering it below the surface of the sea, which means comprise a plurality of rotatable guides, such as e.g. drums or pulleys, over each of which a cable can pass, said rotatable guides being situated above the surface of the water when the apparatus is in its normal, viz. floating, condition. For the sake of brevity, reference will be made hereinafter to pulleys as rotatable guides, but this should be construed as an example and not as a limitation. Each of said cables is attached to an anchor placed on the bottom of the sea and firmly attached thereto, and is further connected to winding means placed on the breeding assembly and actuated by power transmitted from the control vessel. Since the breeding assembly is lowered at times below the surface of the water, the winding means must be such that they are not damaged by being underwater. A preferred, but not exclusive, example of such winding means is constituted by hydraulic winches, that can be actuated by a hydraulic fluid transmitted under pressure by power means located on the control vessel. However other winding means could be used, even electrical ones, provided that they are rendered watertight e.g. by gaskets. The section of each cable from the corresponding pulley to the anchor has its greater length when the apparatus is in its normal condition, but said section can be shortened by actuating said winding means to reel it in, and consequently lower the whole apparatus until its legs rest on the sea bed.

However, in order to do this, the buoyancy of the apparatus, which it is normally such as to keep it floating, must be decreased in order to avoid excessive tension on the said cables. A decrease of the buoyancy is effected by introducing water into the buoyancy elements. The tension on the cables is obviously related to the power required for drawing the apparatus down to the bottom of the sea. The required power can be measured at the power means of the control vessel, and should remain within predetermined limits in order that the tension of the cables also remain within predetermined limits. Therefore the amount by which the buoyancy of the breeding assembly is decreased should be such as to maintain said power within said limits. Of course, the tension of the cables could be measured directly instead of indirectly through said power, and this possibility is not excluded from the invention.

When it is desired to raise the breeding assembly back to its normal operating position, viz. to a floating condition, once the storm has passed, gas pumping means provided on the control vessel will pump compressed gas, practically air, into the buoyancy elements, and thus increase the buoyancy of the apparatus. However, to permit the breeding assembly to rise, the cables which have been reeled in by the apparatus winding means must be paid out, and they should be paid out gradually so that the assembly will rise with the desired speed. For this purpose, the winding means could be reversed, or it may be sufficient to lower the power applied to them (e.g. the pressure of an hydraulic fluid) so that they will not prevent the buoyancy of the apparatus from causing said cables to be paid out. In both operations—lowering the apparatus and raising it—the tension applied to the cables and the increase of the apparatus buoyancy should be controlled as a function of one another, to permit full control of the apparatus operation. Such control can be carried out by an operator located on the control vessel, or by an automatic control suitably programmed. What the aforesaid function should be, can be established by skilled persons by calculation or by tests.

Once the apparatus has been raised, the pulleys will be above the water surface and can be cleaned of any pollution that has occurred during their relatively brief stay within the water. Preferably, the pulleys are four and located at the corners of the apparatus frame, which preferably has a rectangular shape, or at the vicinity of said corners. The winding means may also be four, one for each pulley, or they may be fewer and each may reel in or pay out more than one cable. The gas (air) and water conduits for the control of the buoyancy are preferably supported by the same pulleys that guide the cables in the aforesaid operations, but could be supported differently.

For each apparatus or breeding assembly, a number of floats, preferably four floats or at least a number of floats equal to the number of pulleys, are provided and the cables and air conduits from the control ship to the pulleys and to the floats, will preferably pass through said floats and be guided therefrom. If the control vessel leaves the location, in order to find refuge from a storm, it will disconnect the cable and the air conduit, and these will be retained by the floats. The water to be introduced into the buoyancy elements is preferably pumped from the ship through conduits parallel to the gas conduits and similarly supported. It could be pumped directly from the sea by pumps mounted on the apparatus frame or on the buoyancy elements themselves, and the air could be pumped in a similar way, but such localized pumping would render control of the operations difficult, and it is preferred that all factors relevant to the apparatus lowering or raising be controlled from the control vessel.

Preferably, a number of breeding assemblies are associated and are controlled by the same vessel. In this case, some of the floats are common to more than one of said assemblies, and the cables and gas conduits connected to the control vessel will serve more than one breeding assembly.

Preferably, the breeding assemblies frames are made of trusses, which define one or preferably a plurality of empty spaces or cells and constitute their peripheries, said cells being bottomless. Each cell contains a breeding cage, which is secured at its edges to the periphery of the cell and is supported thereby, said cage being made of a material that allows the passage of water, typically a metal net. The containers hang freely from the cell peripheries and preferably have a convex bottom.

DETAILED DESCRIPTION OF PREFERRED EMBODIMENTS

Figure 1:
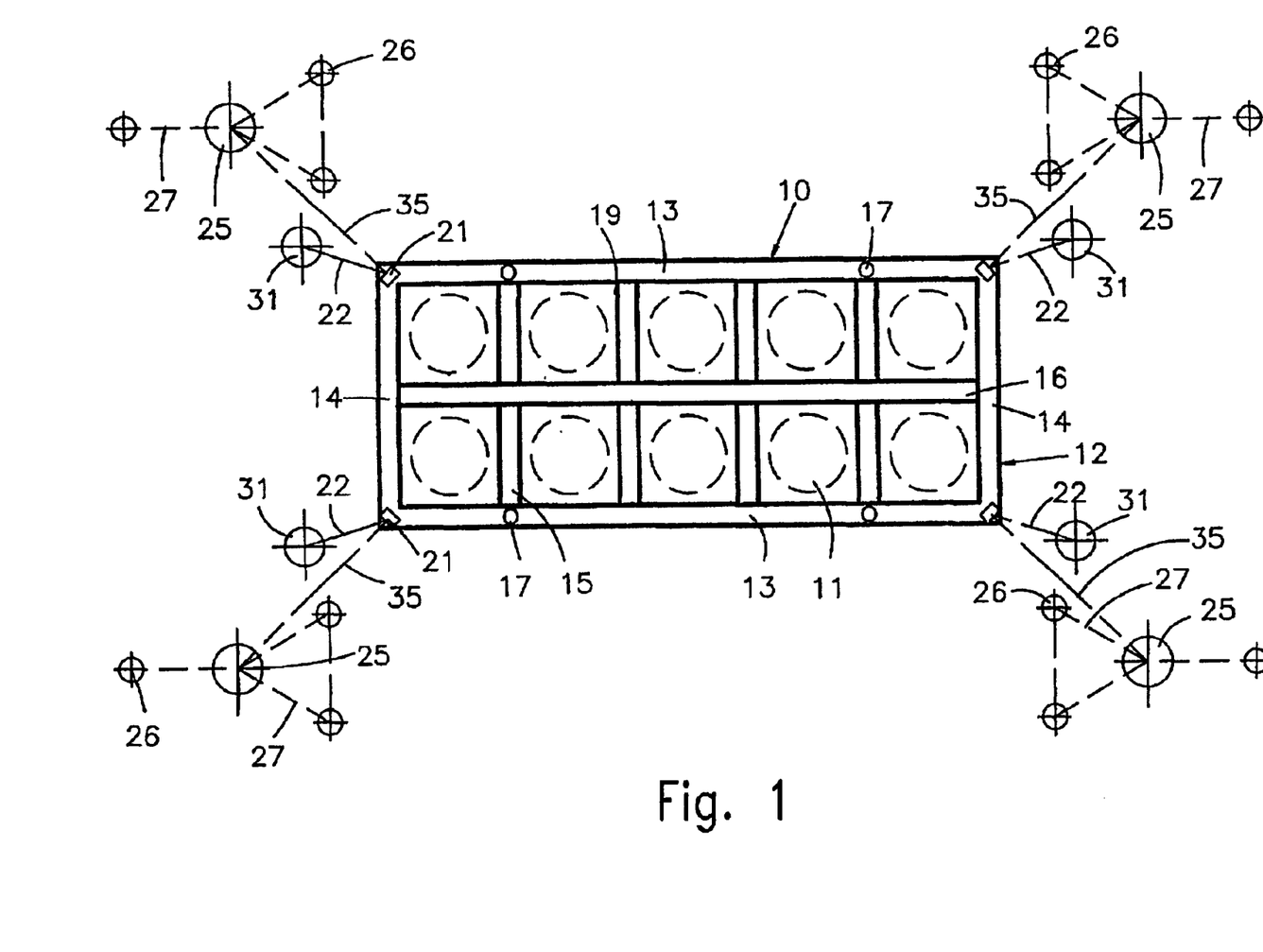
FIG. 1 is a plan view of a fish-breeding assembly according to an embodiment of the invention.
Figure 2:
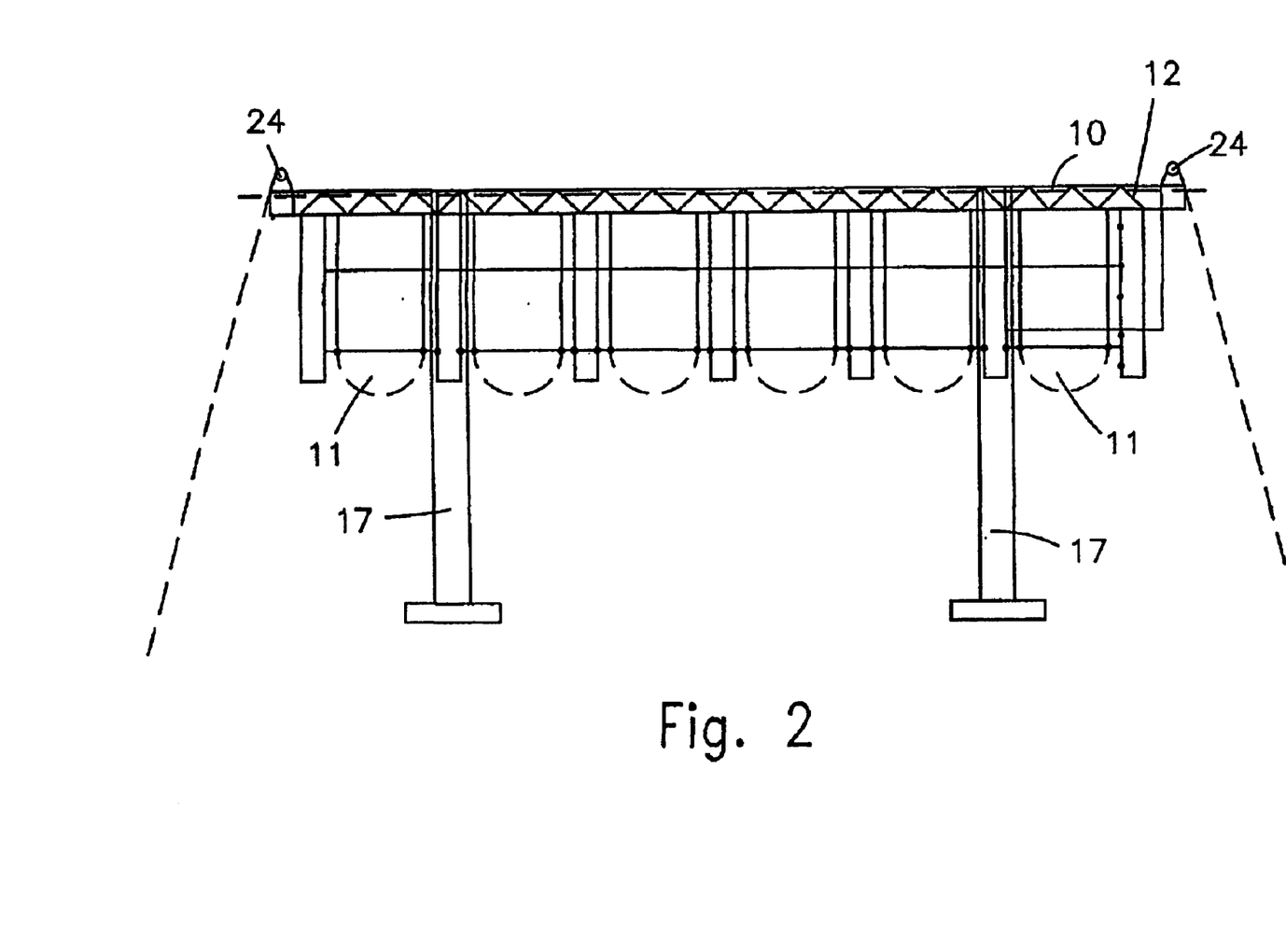
FIG. 2 is a schematic vertical side view of the same.
Figure 3:
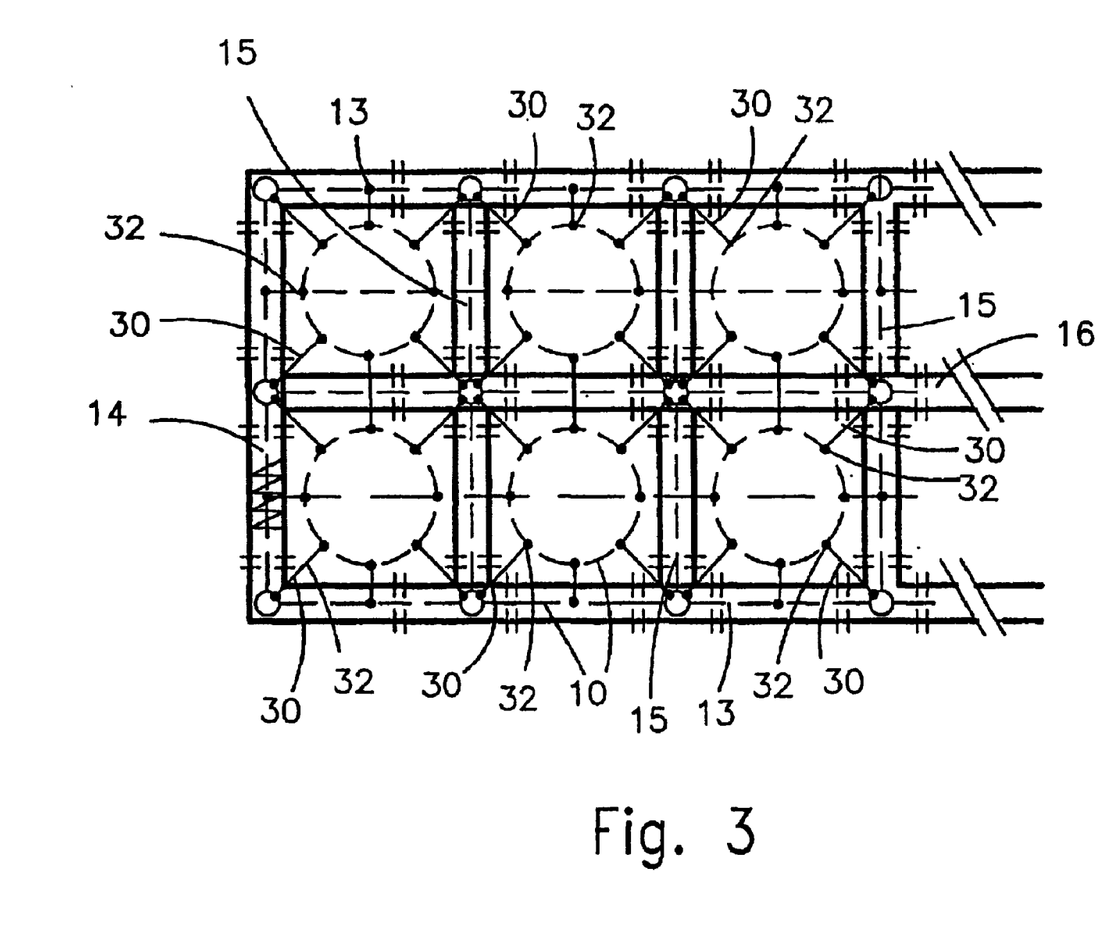
FIG. 3 is schematically indicates how the cages are held in the frame.

Referring now to FIGS. 1 to 3, an apparatus or breeding assembly, generally indicated at 10, comprises a number—in this embodiment, ten—of breeding containers 11. As seen in FIG. 2, the containers 11 have a purse-like conformation, being convex at the bottom. The breeding assembly 10 has a frame 12, consisting of two peripheral members 13, two end members 14, an additional longitudinal member or intermediate member 16 and transverse members 15, all of said members defining a number—in this embodiment, ten—of cells 19. In this embodiment, there are two rows of five containers 11 each and they are separated by intermediate member 16. All the aforesaid members of the frame are preferably constructed as trusses, as schematically shown in FIG. 2. The frame is provided with four corner protrusions 21, each of which carries a pulley (shown at 24 in FIG. 2), around which passes a cable 22, hereinafter to be described. In this embodiment it is assumed that each corner protrusion also carries a hydraulic winch (or other winding means) that reels in or pays out the corresponding cable 22, as desired. However, as has been said, fewer winches could be provided, e.g. only two at opposite corners, and control each more than one cable, e.g. two.

Figure 4:
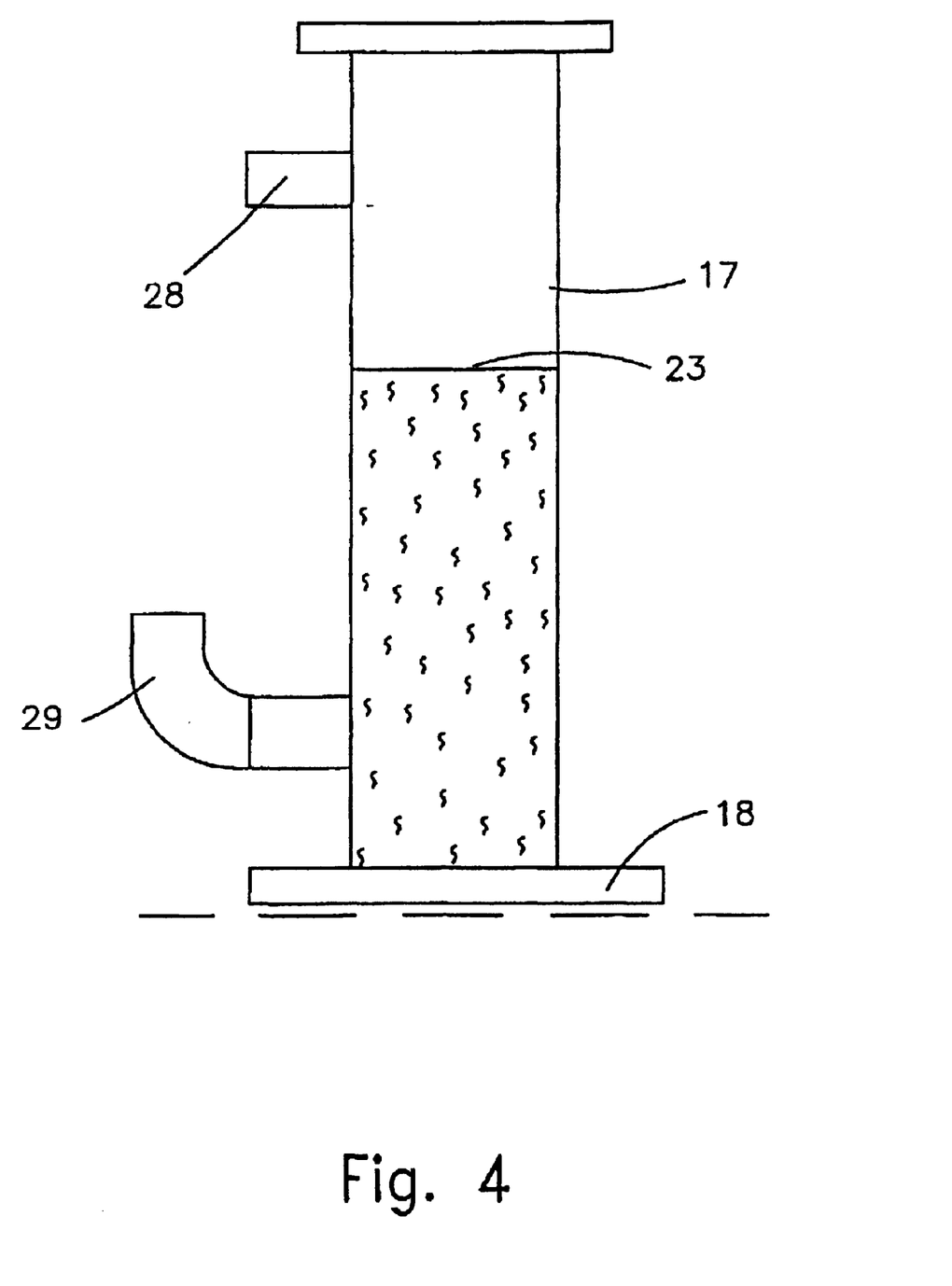
FIG. 4 is a schematic vertical cross-section of a leg serving as a buoyancy element.

The frame 12 is provided with four depending legs 17, serving as buoyancy elements (see FIG. 2). The legs are hollow and preferably made of large cross-section pipes. One such leg is shown in schematic cross-section in FIG. 4., in its lowermost position in which it as rests on the sea bed with a bottom plate 18. It is provided with a top pipe 28 for the inlet/outlet of air and bottom pipe 29 for the inlet/outlet of water. It is shown as full of water up to level 23.

Figure 5:
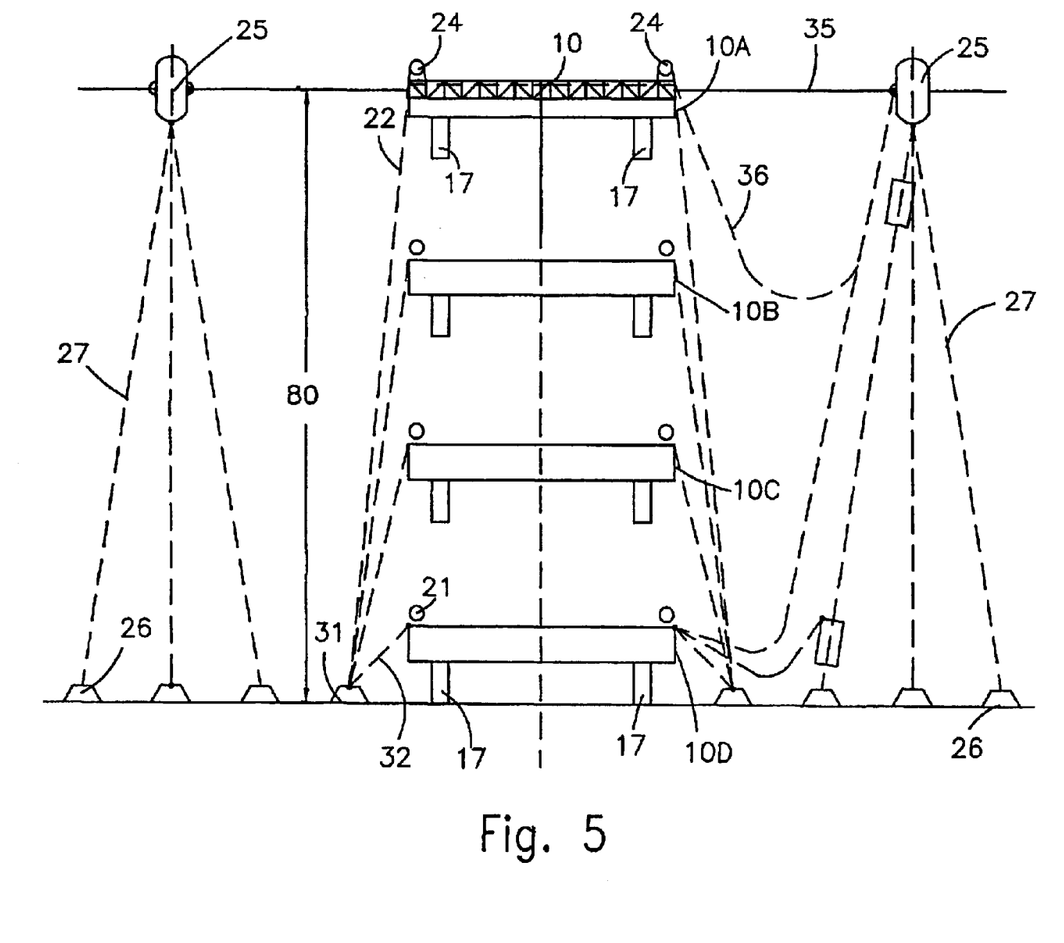
FIG. 5 schematically illustrates the lowering or raising of a breeding assembly.

Frame 10 is connected at its four corners, as indicated at 35, to floats 25, which are kept in place by cables 27 that connected to anchors 26 fixed to the sea bed (see FIGS. 1 and 5).

FIG. 3 schematically illustrates how the breeding containers 11 are connected to frame 10 (broken off in the drawing to omit four cells 19). A number of points 32 (six for each container 11 in the drawing, but this number is only an example) is connected by a cable 30 to one of the elements of the frame or other connection.

FIG. 5 illustrates schematically how the apparatus can be lowered. Cables 22 that pass around pulleys 24 are attached to an anchor 31 fixed on the bottom of the sea. There are therefore four anchors 31 corresponding to the four pulleys 24 (see FIG. 6). In the top position of the breeding assembly 10, indicated as 10A, the distance between pulleys 24 and anchors 31 is at a maximum. If traction is applied to cables 22 by the corresponding winding means, e.g. a hydraulic winch, the cables are reeled in, and those segments decrease, until the position is reached in which the legs 17 of the frame 10 rest on the bottom of the sea. In this position, the length of cable between the pulleys 24 and the anchors 31 is at the minimum.

As the cable 22 is reeled in by the corresponding winding means, and the breeding assembly is drawn to the bottom of the sea, the buoyancy thereof can be reduced to avoid excessive stress on the cables. This is done by admitting more water in the buoyancy elements, specifically the legs 17, by decreasing the air pressure therein. A slight buoyancy is always desirable, but it should be small enough so that the stress on the cables 22 should be moderate. That stress can be measured by the power required from the power source to reel the cables in and the buoyancy of the legs 17 must be controlled to maintain that tension within predetermined limits. This control can be done automatically, to reduce to a minimum the need for manpower on the control vessel. Once the lowering operation has been accomplished, the control vessel will usually leave its operative position to seek haven against the storm; and in order to do so, the control personnel must separate the portions of the cables and of the gas and water conduits that remain connected with the breeding assemblies, from their terminals that are on the vessel. Once this has been done, said separated portions will be retained by the floats 25.

Likewise, when the storm has passed and the cables 22 are being paid out, the buoyancy of the buoyancy elements can be increased to cause the breeding assembly to rise to the surface of the sea. However, that rise must be sufficiently slow and must be controlled so that a certain predetermined tension be maintained in the cables 22. This, too, of course, can be done automatically. It should be kept in mind that, when the containers 11 of the apparatus contain a significant load of fish, and the apparatus is raised after having been lowered to a considerable depth below sea level, the fish may be damaged by decompression and this can and should be avoided by raising the apparatus slowly enough.

In order to effect the raising of the apparatus and the resume operation thereafter, once the control vessel has returned to its operative position the control personnel must connect once more the cables and the gas and water lines, that have been retained by the floats, with their terminals on the vessel.

Figure 6:
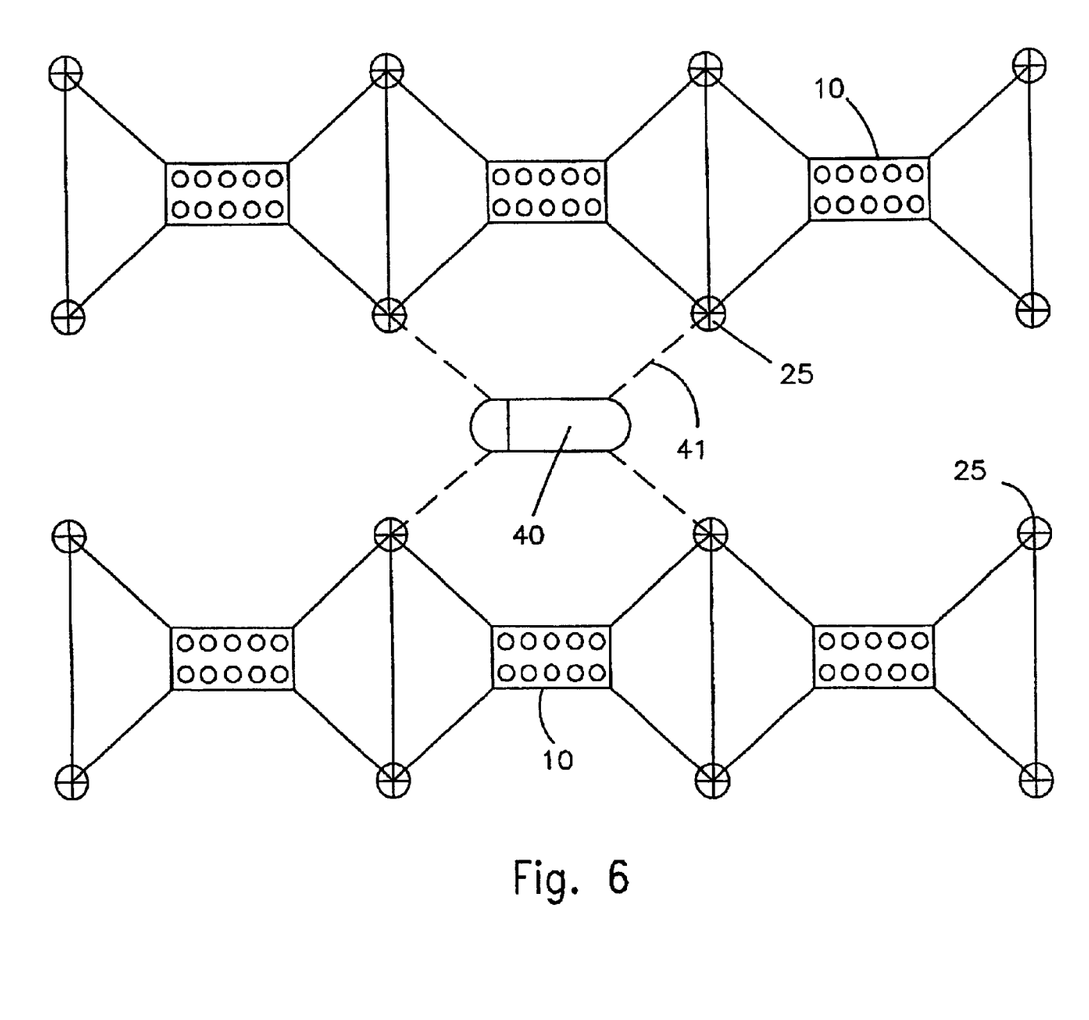
FIG. 6 schematically illustrates the connection of a breeding assembly to sunk and to floating auxiliary elements.

FIG. 6 illustrates in plan view the connection, hereinbefore described, of the breeding assemblies to the floats 25.

Figure 7:
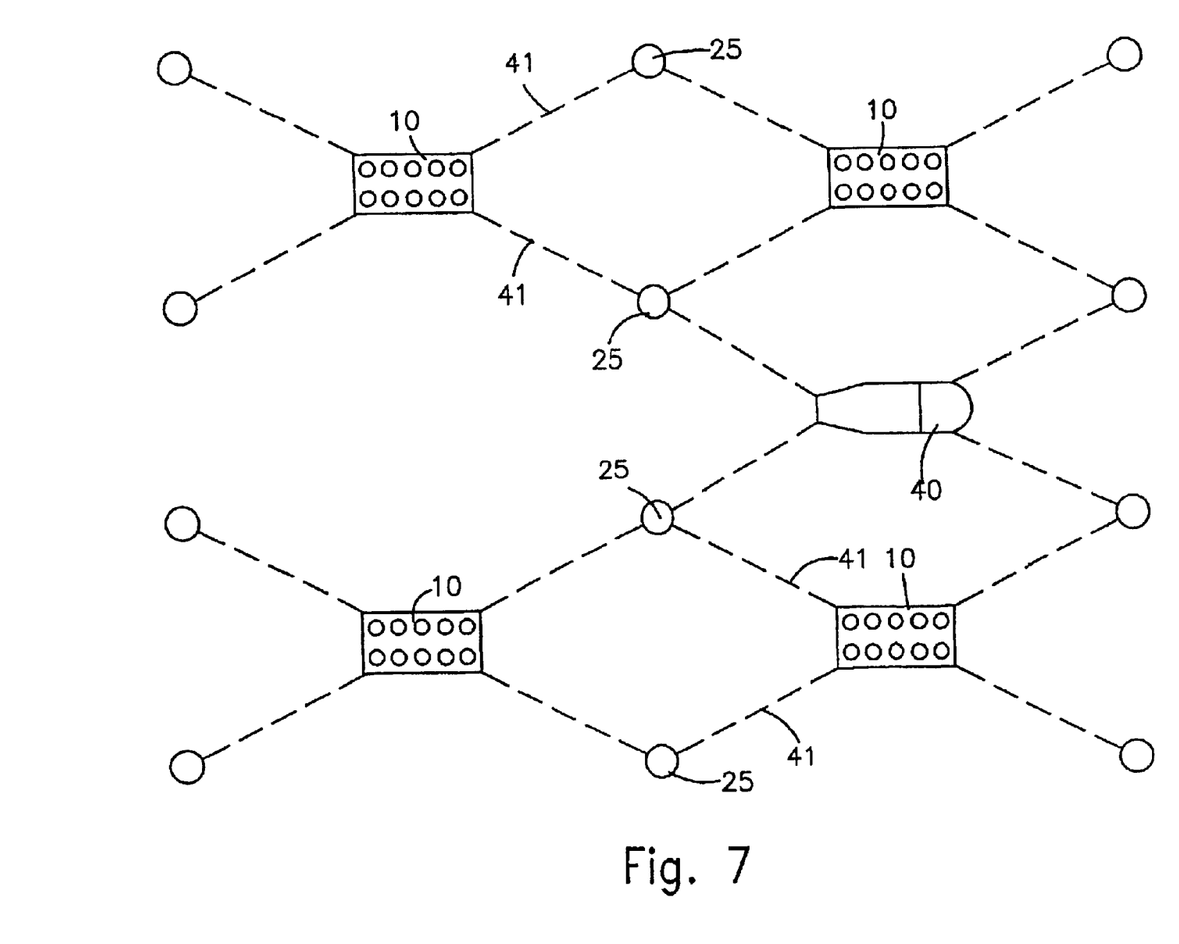
FIG. 7 schematically illustrates how a number of breeding assemblies are controlled by means of common control elements.

FIG. 7 illustrates the connection of various breeding assemblies 10 with a single control vessel 40. Four breeding assemblies are shown in the drawing, for purposes of example, but this number is only an example. Adjacent assemblies are controlled from common floats 25. The lines 41 indicate concurrently the cables 22 and the air and water lines. As is seen, they are common to all the assemblies shown in the embodiment of FIG. 7.

While embodiments of the invention have been shown by way of illustration, it will be understood that many modifications, variations and adaptations can be made therein without departing from the spirit of the invention or exceeding the scope of the claims.

What is claimed is:

1. Fish-breeding apparatus, which comprises a frame, supporting one or a plurality of breeding cages and provided with hollow buoyancy elements whereby to float when desired, the apparatus being provided with means for lowering it below the surface of the sea, which means comprise a plurality of rotatable guides carried by the frame, and plurality of cables passing over the rotatable guides and attached to anchors fixed to the bottom of the sea, said rotatable guides being situated ahoy the surface of the water when the apparatus is in its floating condition.

2. Apparatus according to claim 1, wherein the buoyancy elements are emptied of water by replacing the water with air.

3. Apparatus according to claim 1, wherein the volume of the buoyancy elements are such that when they are empty of water to a predetermined extent, the entire apparatus floats, even when it is fully charged.

4. Apparatus according to claim 1, wherein the frame has depending legs, so that even in its lowermost position the bottoms of the breeding cage will be spaced from the sea bed.

5. Apparatus according to claim 1, wherein the frame supports a number of breeding containers, each of which is constituted by material that allows the passage of water.

6. Apparatus according to claim 1, wherein each of the cables is attached to an anchor placed on the bottom of the sea and firmly attached thereto, and is further connected to winding means mounted on the breeding assembly.

7. Apparatus according to claim 6, wherein the winding means are actuated by power means placed on a control vessel.

8. Apparatus according to claim 6, wherein the winding means are hydraulic winches actuated by hydraulic fluid transmitted under pressure from the control vessel.

9. Apparatus according to claim 6, wherein the winding means are water-tight.

10. Apparatus according to claim 6, wherein the section of each cable from the corresponding rotatable guide can be shortened by actuating the winding means to reel it in, whereby to lower the apparatus until its legs rest on the sea bed.

11. Apparatus according to claim 1, further combined with gas pumping means for pumping gas into the buoyancy elements, and thus increase the buoyancy of the apparatus, when it is desired to raise the apparatus, that has been lowered whereby to restore it to a floating condition.

12. Apparatus according to claim 1, comprising means for paying out gradually the cables, that have been reeled in to lower the apparatus, in order to permit the apparatus to rise with the a predetermined speed.

13. Apparatus according to claim 1, comprising means for controlling the tension applied to the cables and the changes of the apparatus buoyancy as a function of one another.

14. Apparatus according to claim 1, wherein the rotatable des are above the water surface when the apparatus is in floating condition.

15. Apparatus according to claim 1, further comprising a plurality of floats.

16. Apparatus according to claim 15, wherein the floats comprise means for guiding and retaining, when desired, or at least a number of the cables and the gas and water conduits.

17. Apparatus according to claim 1, wherein the apparatus frames are made of trusses.

18. Apparatus according to claim 1, wherein the apparatus frames define one or a plurality of empty cells and constitute their peripheries, said cells being bottomless.

19. Apparatus according to claim 18, wherein each cell contains a breeding cage, which is secured at its edges to the periphery of the cell and is supported thereby, said cage being made of a material that allows the passage of water, said containers hanging freely from said cell peripheries.

20. Apparatus according to claim 1, wherein the buoyancy elements are depending legs formed of cylindrical pipes, provided with a gas inlet/outlet and a water inlet/outlet.

21. Apparatus according to claim 1, wherein the legs are hollow tubular structures, which constitute the buoyancy elements.

22. Fish-breeding apparatus, which comprises a frame, supporting one or a plurality of breeding cages and provided with hollow buoyancy elements, and means for controlling the buoyancy of the apparatus by filling, totally or partially, said buoyancy elements with water and emptying them of the water, totally or partially, when desired, the apparatus being provided with means for lowering it below the surface of the sea, which means comprise a plurality of rotatable guides over each of which a cable can pass, said rotatable guides being situated above the surface of the water when the apparatus is in its floating condition;

wherein the frame has depending legs, so that even in its lowermost position the bottoms of the breeding cage will be spaced from the sea bed;

wherein the legs are hollow tubular structures, which constitute the buoyancy elements.

* * * * *